United States Patent
Weinberg et al.

(10) Patent No.: US 8,272,538 B2
(45) Date of Patent: Sep. 25, 2012

(54) WINE BOTTLE SEALING AND DISPENSING DEVICE

(76) Inventors: Morgan William Weinberg, Alexandria, VA (US); Burton Allen Miller, Washington, DC (US)

( * ) Notice: Subject to any disclaimer, the term of this patent is extended or adjusted under 35 U.S.C. 154(b) by 620 days.

(21) Appl. No.: 12/458,236

(22) Filed: Jul. 6, 2009

(65) Prior Publication Data

US 2010/0006603 A1    Jan. 14, 2010

Related U.S. Application Data

(60) Provisional application No. 61/129,606, filed on Jul. 8, 2008.

(51) Int. Cl.
*B67D 1/08* (2006.01)
(52) U.S. Cl. .................. 222/152; 222/399
(58) Field of Classification Search .......... 222/152, 222/81–83, 399, 396, 397, 5, 325–327
See application file for complete search history.

(56) References Cited

U.S. PATENT DOCUMENTS

| | | | |
|---|---|---|---|
| 718,163 A | 1/1903 | Sherrard | |
| 3,372,838 A * | 3/1968 | Smith et al. | 222/61 |
| 3,420,418 A * | 1/1969 | Bennett et al. | 222/399 |
| 3,883,043 A | 5/1975 | Lane | |
| 4,011,971 A | 3/1977 | Haydon | |
| 4,401,016 A * | 8/1983 | Adams et al. | 99/323.1 |
| 4,473,174 A * | 9/1984 | Heuser | 222/152 |
| 4,477,477 A | 10/1984 | Arter | |
| 4,595,121 A | 6/1986 | Schultz | |
| 4,691,842 A | 9/1987 | Foures | |
| 4,702,396 A | 10/1987 | Gwiazda | |
| 4,735,348 A * | 4/1988 | Santoiemmo et al. | 222/399 |
| 4,828,147 A * | 5/1989 | Wiedmann et al. | 222/82 |
| 4,984,711 A | 1/1991 | Ellis | |
| 5,139,179 A | 8/1992 | Cecil | |
| 5,566,730 A * | 10/1996 | Liebmann, Jr. | 141/64 |
| 7,395,949 B2 | 7/2008 | Ehret et al. | |
| 2005/0142260 A1 | 6/2005 | Chen et al. | |
| 2006/0163290 A1 | 7/2006 | Ehret | |
| 2008/0170963 A1 | 7/2008 | Cantrell | |

FOREIGN PATENT DOCUMENTS

| | | |
|---|---|---|
| DE | 2449861 | 4/1975 |
| FR | 2601962 | 1/1988 |
| GB | 2217787 | 11/1989 |
| WO | WO8702345 | 4/1987 |

* cited by examiner

*Primary Examiner* — Lien Ngo
(74) *Attorney, Agent, or Firm* — Richard C. Litman

(57) ABSTRACT

The wine bottle sealing and dispensing device provides for the dispensing of wine from a wine bottle, or any other liquid from a corresponding liquid container, without exposing the wine or liquid in the bottle to environmental air at any time. The device includes a housing adapted for mounting above a cork of a corked wine bottle. An upper open end of a hollow needle is mounted in the housing, the needle projecting downward from the housing and terminating in a tip adapted for insertion through the cork. A first end of a spout projects outwardly from the housing, and a second end of the spout is in fluid communication with the upper open end of the hollow needle. A cartridge of pressurized, inert gas is mounted to the housing. The cartridge is in communication with an upper end of a gas conduit, which is mounted within the hollow needle.

3 Claims, 13 Drawing Sheets

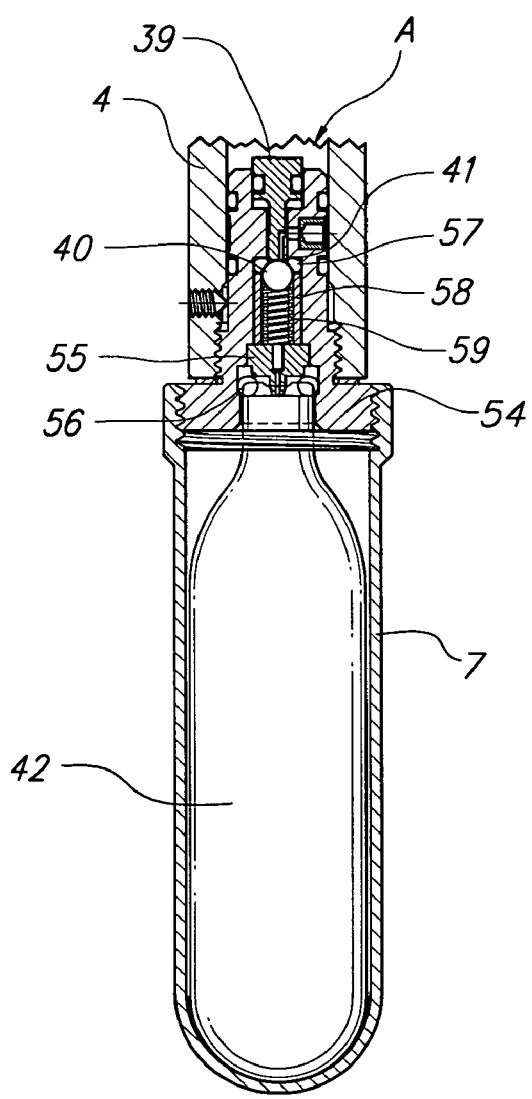
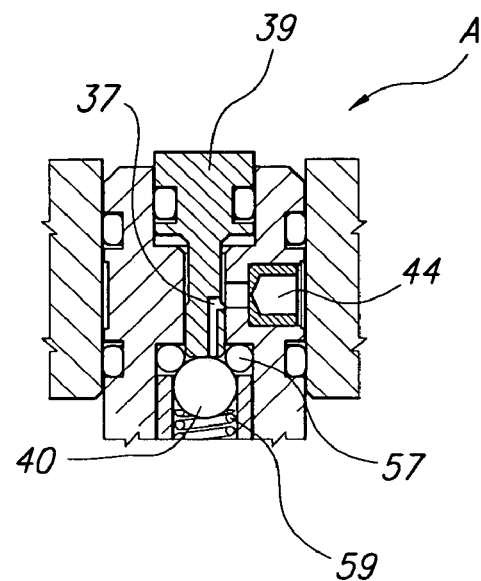
Fig. 14
Fig. 15

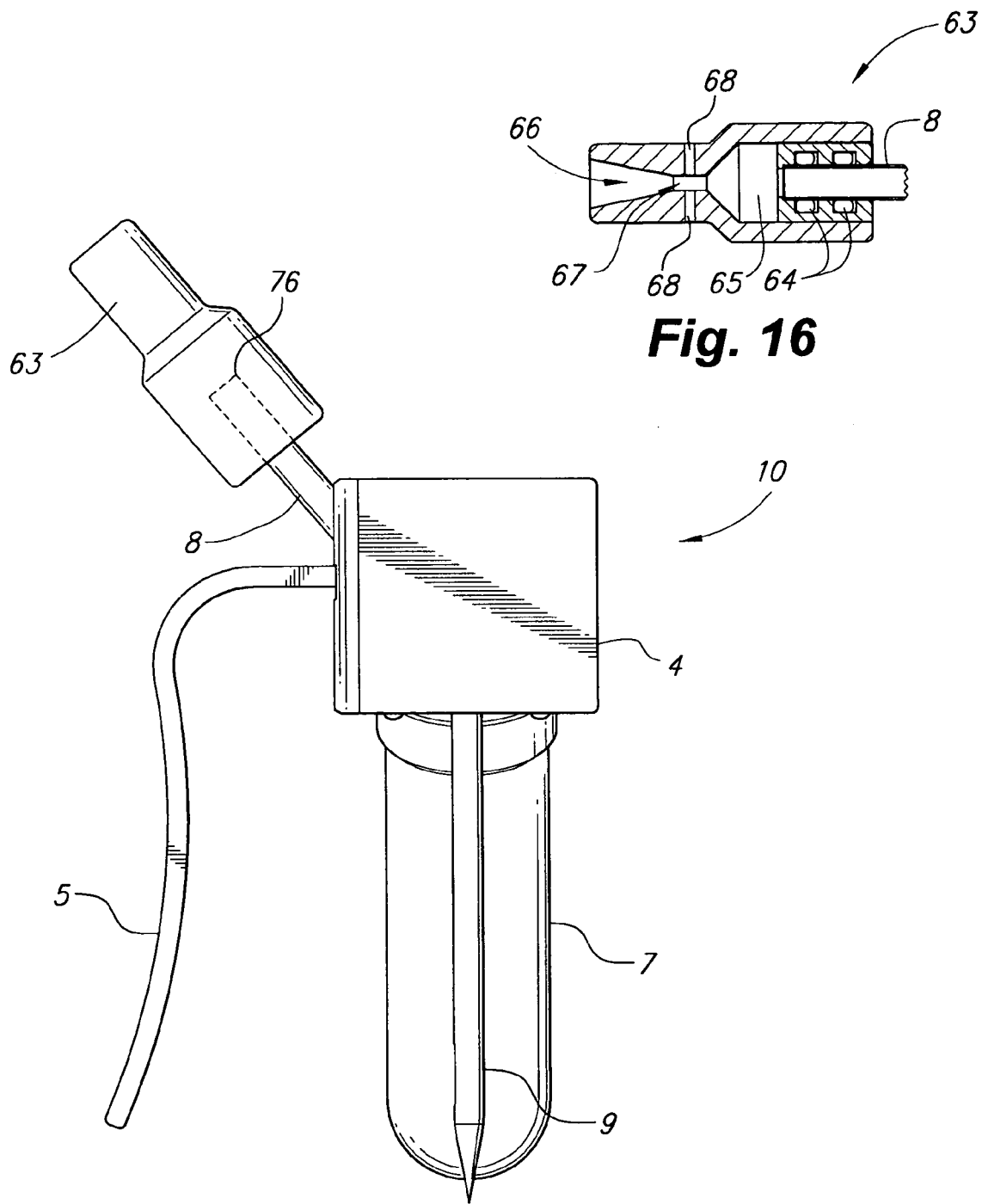

WINE BOTTLE SEALING AND DISPENSING DEVICE

CROSS-REFERENCE TO RELATED APPLICATION

This application claims the benefit of U.S. Provisional Patent Application Ser. No. 61/129,606, filed Jul. 8, 2008.

BACKGROUND OF THE INVENTION

1. Field of the Invention

The present invention relates to fluid dispensers. Particularly, the present invention relates to the preservation and dispensing of wine, or any other desired fluids which may spoil upon exposure to environmental air, through the injection of pressurized, inert gas into the bottle of wine or other fluid container.

2. Description of the Related Art

Upon opening of a bottle of wine, the wine immediately begins to react with the environmental air and begins to spoil. Thus, if the entire bottle of wine is not consumed in one sitting, the exposure to air decreases the quality and value of the wine.

A wide variety of wine preservation systems have been used to delay this spoilage, with varying degrees of success. One such typical system is a vacuum pump incorporated with, or attached to, a rubber cork having a one-way air valve. In such a vacuum system, the user corks the bottle of wine and pumps out as much air as possible in an attempt to leave virtually no air within the bottle. Typically, thirty or more hand actuations of the pump are required to attain a minimal air pressure within the bottle. It should be noted that a perfect vacuum is impossible to achieve within the bottle. Thirty hand actuations of the pump represents substantial effort by a person hoping to preserve his or her wine, and would require an excessive effort in the hospitality industry, hoping to preserve wines sold by the glass. Even after thirty or more actuations of the pump, small amounts of air remain in the bottle and react with the wine. The time by which spoilage of the wine is postponed in a bottle preserved with a hand-actuated vacuum pump is generally unsatisfactory. Additionally, the vacuum in such a system can damage the wine by pulling volatile aromatic components out of solution, rendering the wine dull and "without a nose". Motorized systems have been used to aid in the aforementioned pumping problem, however the repetitive detachment, reattachment, and activation of the pump is quite cumbersome.

Another typical preservation system utilizes an aerosol-style can to deliver pressurized gas into an opened wine bottle. The pressurized gas is typically a mixture of gases believed to be inert with respect to wine. Once the gas mixture is sprayed into the opened wine bottle, the wine bottle is re-corked to seal the inert gas mixture within. A typical gas used in the mixture is argon gas. Argon, however, cannot be kept in large quantities at the maximum pressure typically containable by an aerosol-style spray can. In addition, the delivery mechanism causes the gasses to overflow the opened wine bottle and escape into the atmosphere. A further problem with argon aerosol cans is that with every pour, air is drawn into the bottle, exposing the contents to air as the wine flows out. Further, the argon gas, while heavier than air, only provides a blanket for the time it takes for oxygen to diffuse through the argon layer. It should be noted that argon forms 0.94% of the Earth's atmosphere, and there is not a thin layer of argon blanketing the ground. Its concentration is uniform in the atmosphere. Another commonly used gas in such systems is carbon dioxide, which generally does not react with the wine in such a way as to affect the wine's flavor. However, the carbon dioxide is eventually absorbed by the wine so that the wine becomes lightly carbonated after a day or two. The resulting fizziness of the wine is distinctly unpleasant to wine connoisseurs.

Wine dispensing cabinets are also known in the art. Opened wine bottles are kept in a cabinet and are sealed with an inlet for non-reactive gas and an outlet for wine. The non-reactive gas is pressurized within the opened and sealed wine bottles so that wine is pressed out of the outlet by the gas pressure. Opening a liquid dispenser valve allows the wine to flow into a glass. The primary disadvantages of wine dispensing cabinets are expense and limited capacity. Such cabinets are plumbed to preserve and dispense a limited number of bottles of wine at any given time. Additionally, a relatively small dispensing cabinet takes up over five square feet of counter space for only eight bottles of wine. The price and space requirements of such a system are out of reach for most individual consumers. A further problem with such cabinets is that the bottles ensconced therein are not portable. When one receives a glass of wine from such a cabinet, there exists no way to examine the bottle beforehand, which may be of interest to customers in a bar or restaurant, especially if the per-glass price is high. A further drawback is that a plastic tube or other such delivery means is dropped into each bottle, thus tainting and contaminating the wine. Further, such cabinets require constant maintenance.

A common problem of all of the aforementioned devices and systems is that the user must pull the cork before any wine is dispensed, thus exposing the wine to an in-rush of atmospheric air, displacing the bottle atmosphere. Thus, a wine bottle sealing and dispensing device solving the aforementioned problems is desired.

SUMMARY OF THE INVENTION

The wine bottle sealing and dispensing device provides for the dispensing of wine from a wine bottle without exposing the wine in the bottle to environmental air at any time. The device includes a housing adapted for mounting above a cork of a corked wine bottle, or a screw cap of a capped bottle. The housing defines an open interior region therein. The device has a hollow needle having an upper open end and a lower end, the lower end having a liquid port formed therethrough. The upper open end of the needle is mounted to the housing and projects downwardly therefrom. The lower end of the needle terminates in a relatively sharp tip adapted for insertion through the cork and into the corked wine bottle.

The device includes a spout having opposed first and second ends. The first end of the spout is exposed and projects outwardly from the housing, and the second end extends into the housing and is in fluid communication with the upper open end of the hollow needle. An aerator may be secured to the first end of the spout or, alternatively, a removable cap may be provided for covering and sealing the spout. Preferably, a piston is slidably mounted within the housing. A lower end of the piston selectively and releasably covers the upper end of the hollow needle.

Preferably, a resilient element, such as a helical spring or the like, resiliently biases the upper end of the piston against an inner surface of the housing. A trigger member is pivotally secured to the housing and is coupled to the piston, so that when a user pivots the trigger member with respect to the housing, the piston is raised from a closed position, where the lower end thereof covers and seals the upper end of the hollow needle, to an open position, where wine from within the bottle is free to flow between the upper end of the hollow needle to the second end of the spout for dispensing thereof.

A cartridge of pressurized, inert gas is mounted to the housing. The cartridge is in fluid communication with an upper end of a gas conduit, which is mounted within the hollow needle. A lower end of the gas conduit is in fluid communication with a gas port formed through the hollow needle adjacent the tip thereof. Preferably, a cartridge holder adapted for receiving the cartridge of pressurized, inert gas is releasably attached to the housing by a threaded connection or the like, which allows for the removal and replacement of the cartridge of pressurized, inert gas.

A spring-biased ball valve for controlling gas flow between the cartridge of pressurized inert gas and the gas conduit is preferably mounted within the housing. A pusher pin is slidably received within the housing so that a lower end of the pusher pin bears against the spring-biased ball valve. Selective downward movement of the pusher pin opens the ball valve to release the pressurized, inert gas from the cartridge. A cam is pivotally mounted within the housing. A first end of the cam contacts the upper end of the piston, and a second end contacts an upper end of the pusher pin. In use, upward movement of the piston causes downward movement of the pusher pin to release the pressurized, inert gas from the cartridge. As a safety measure, the piston opens communication between the wine and spout before any gas from the cartridge is released.

These and other features of the present invention will become readily apparent upon further review of the following specification and drawings.

BRIEF DESCRIPTION OF THE DRAWINGS

FIG. 14 is a sectional view along lines 14-14 of FIG. 2.

FIG. 15 is a partial enlarged section view of the gas-delivery assembly of FIG. 14.

FIG. 16 is a partial side view in section of an alternative embodiment of an aerator for a wine bottle sealing and dispensing device according to the present invention.

FIG. 17 is a side view an alternative embodiment of a wine bottle sealing and dispensing device according to the present invention, equipped with the aerator of FIG. 16.

Similar reference characters denote corresponding features consistently throughout the attached drawings.

DETAILED DESCRIPTION OF THE PREFERRED EMBODIMENTS

Figure 1:
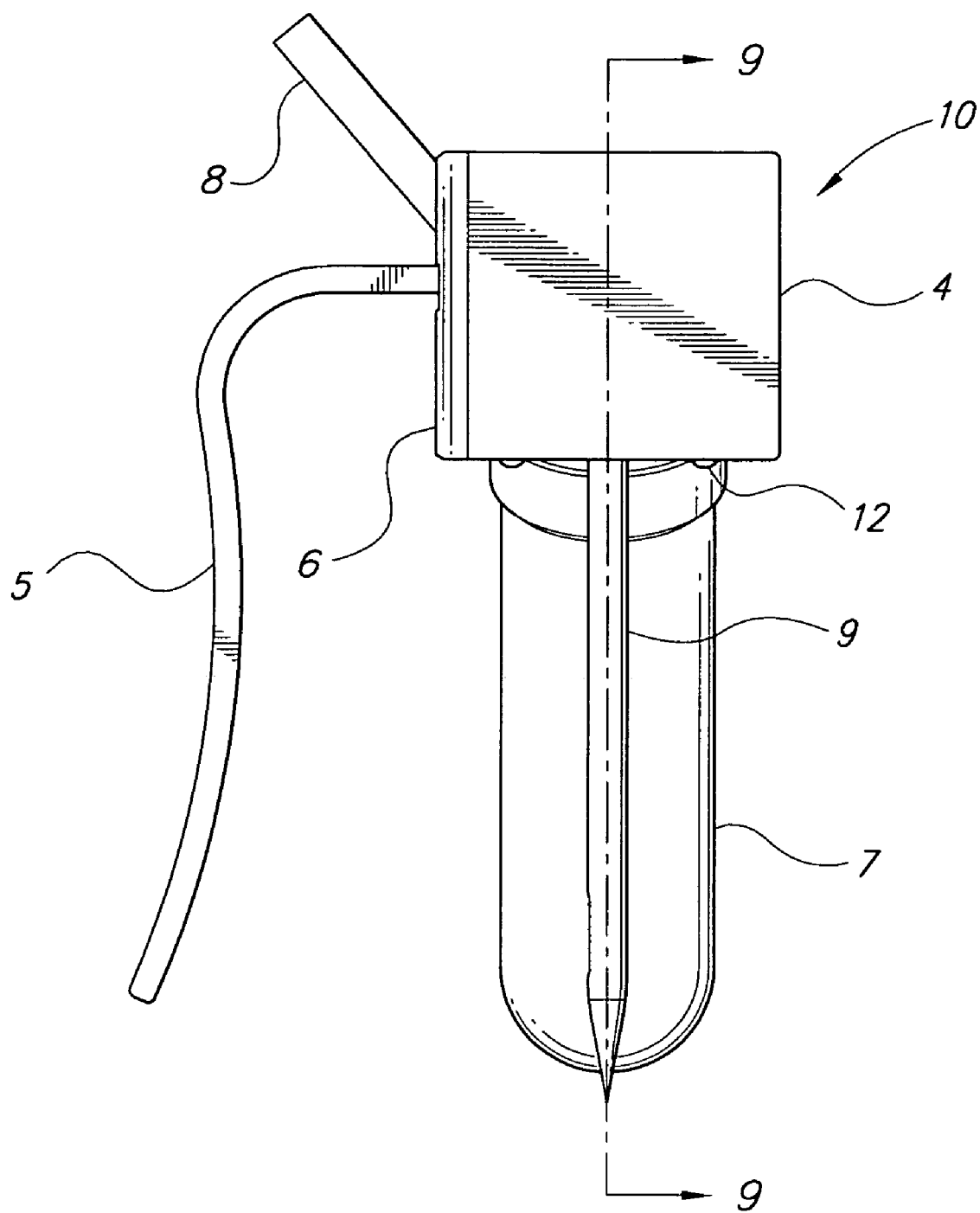
FIG. 1 is a side view of a wine bottle sealing and dispensing device according to the present invention.
Figure 2:
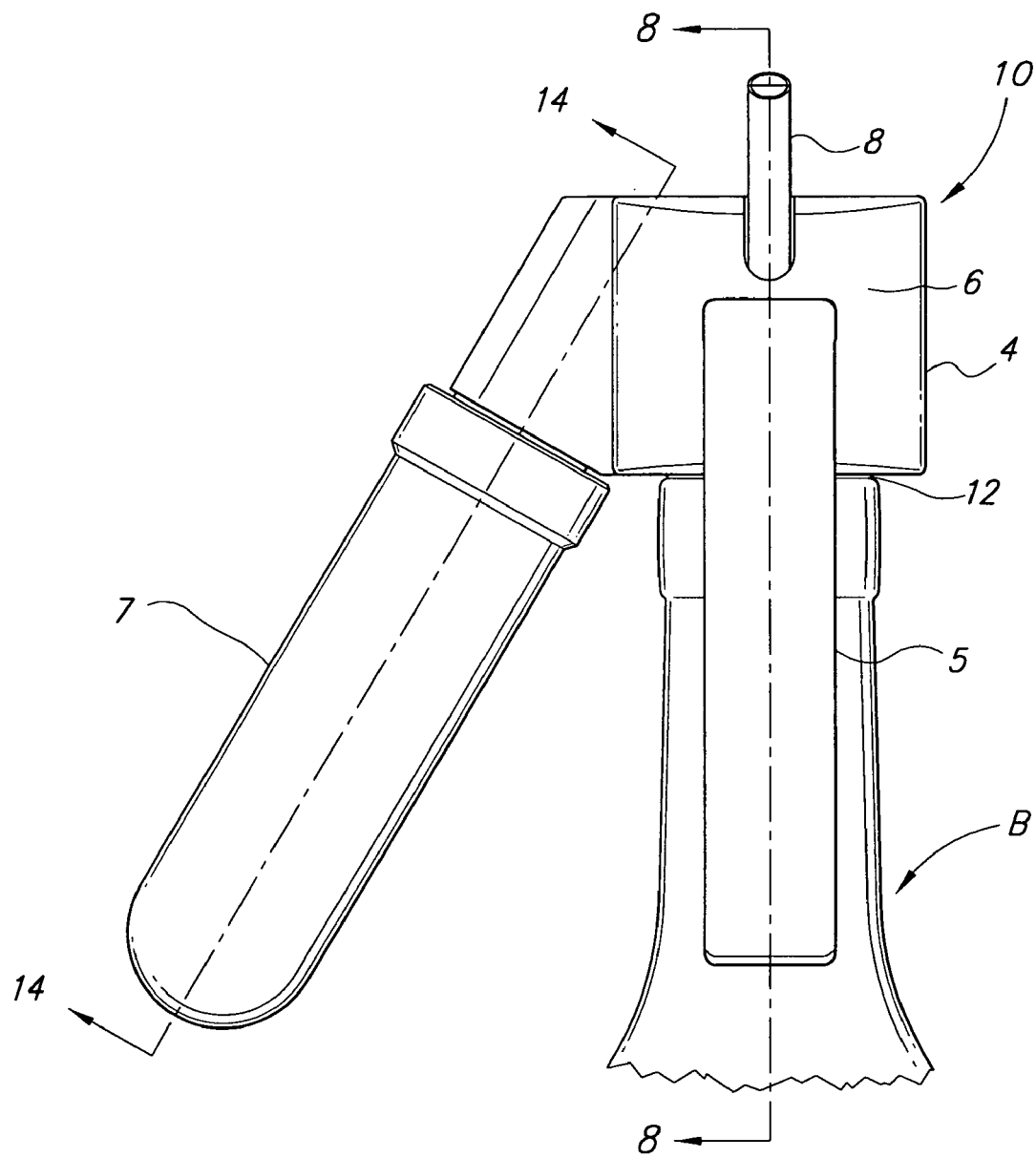
FIG. 2 is a partial environmental front view of the wine bottle sealing and dispensing device of FIG. 1.
Figure 3:
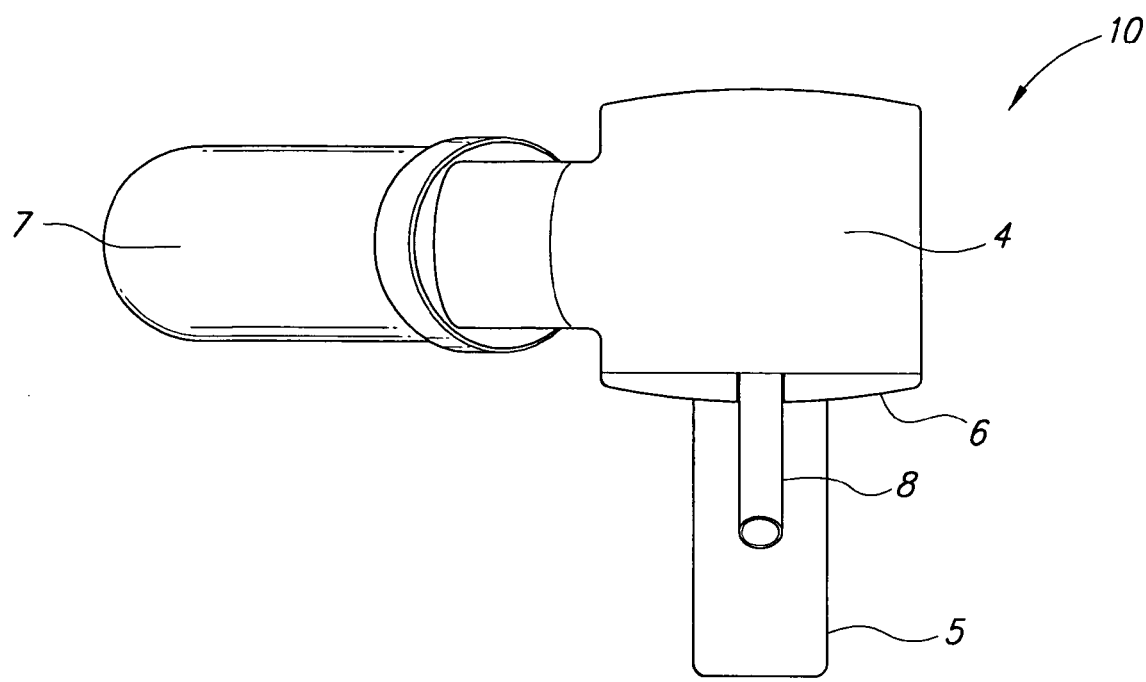
FIG. 3 is a top view of the wine bottle sealing and dispensing device of FIG. 1.
Figure 7:
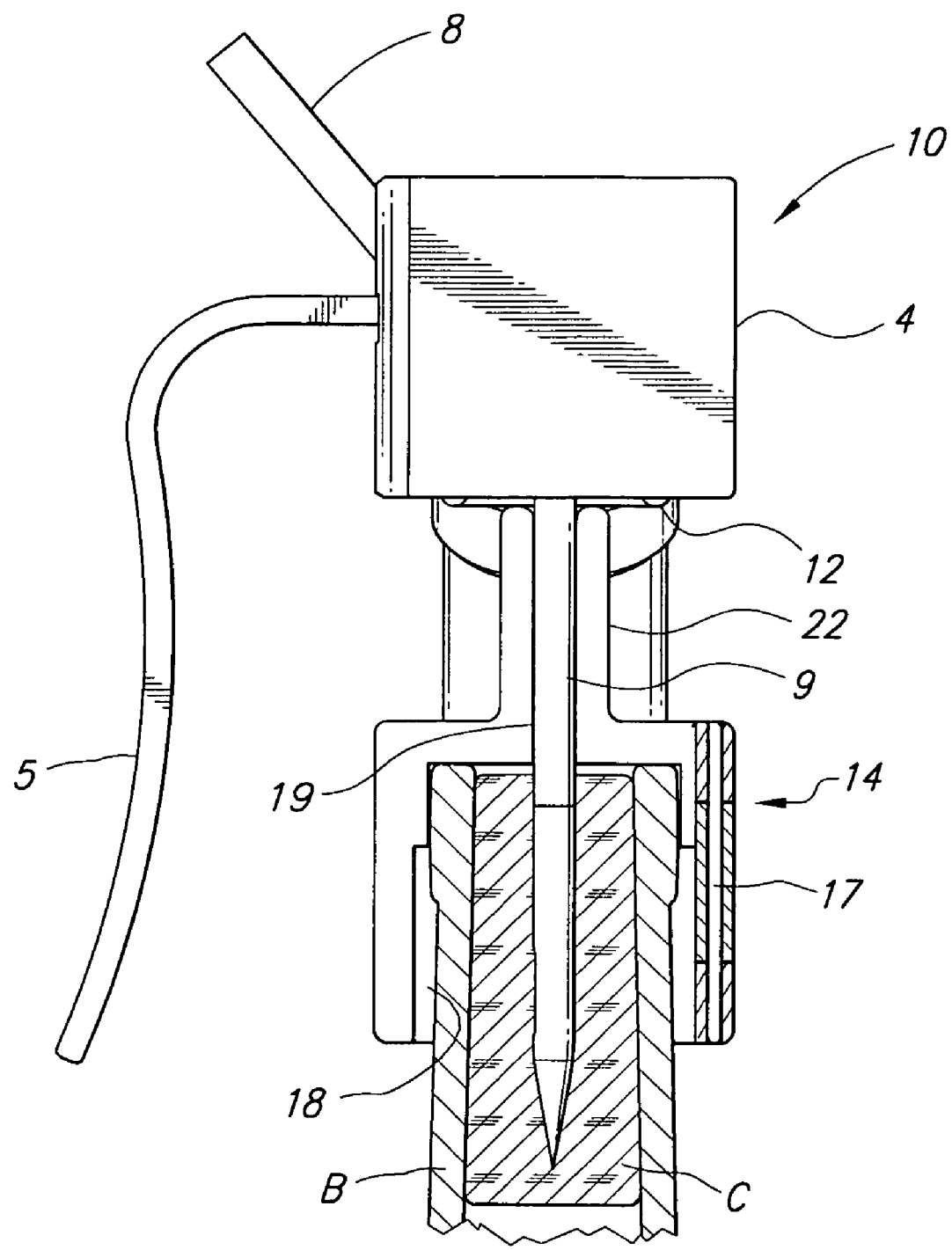
FIG. 7 is a partial environmental side view of a wine bottle sealing and dispensing device and the insertion guide, with the insertion guide of FIGS. 6 and 7 being shown cut-away.

Referring to FIGS. 1-3, the wine bottle sealing and dispensing device 10 provides for the dispensing of wine from a wine bottle (such as exemplary wine bottle B, shown in FIG. 2) without exposing the wine in the bottle B to environmental air at any time. The device 10 includes a housing 4 adapted for mounting above an upper surface of a cork C (as shown in FIG. 7) of a corked wine bottle B. The housing 4 defines an open interior region therein. As best shown in FIG. 2, a decorative faceplate 6 may be attached to housing 4. It should be understood that the shape and relative dimensions of housing 4 (and faceplate 6) may be varied, and those shown in the drawings are for exemplary purposes only.

Figure 8:
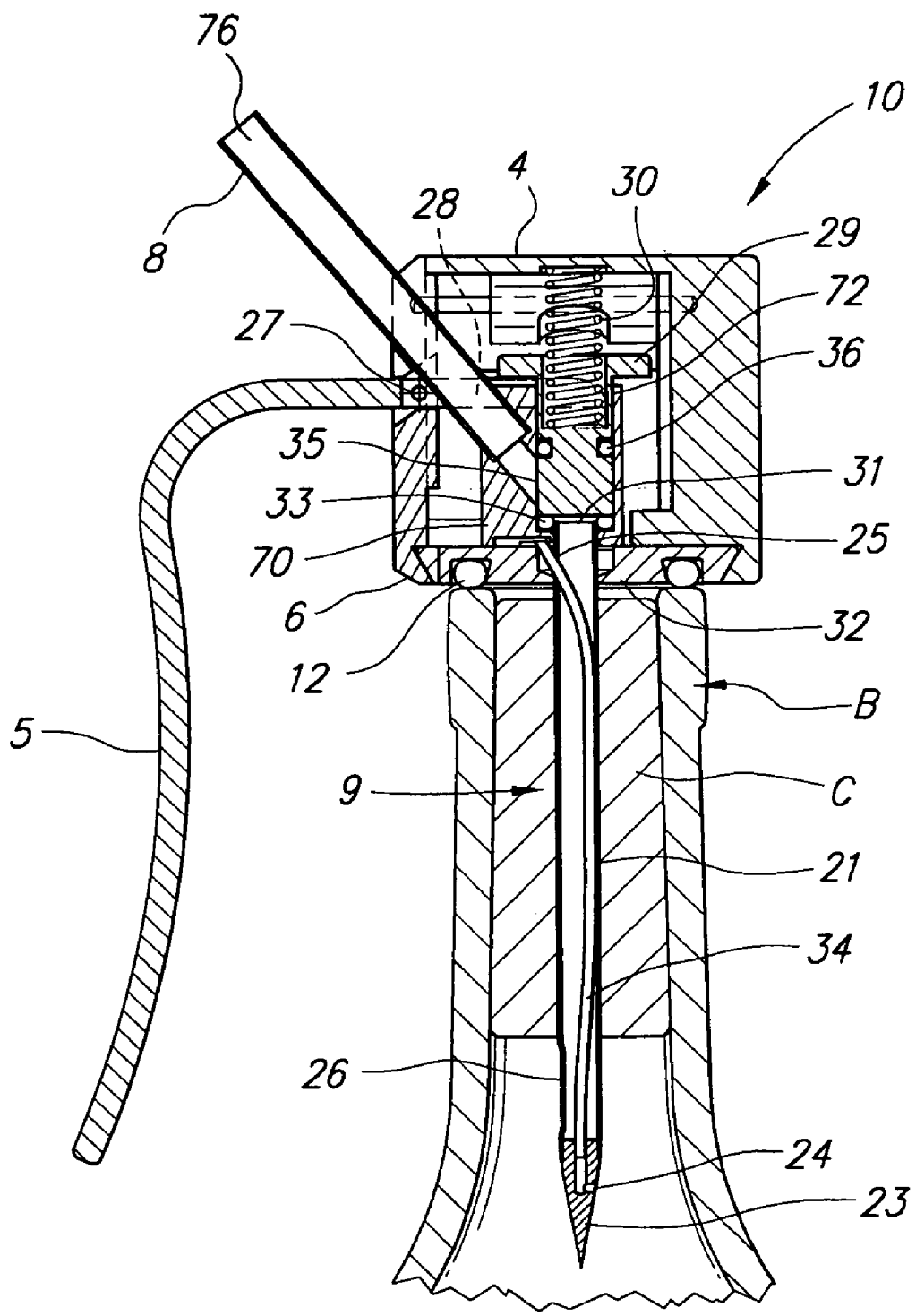
FIG. 8 is a section view along lines 8-8 of FIG. 2.
Figure 9:
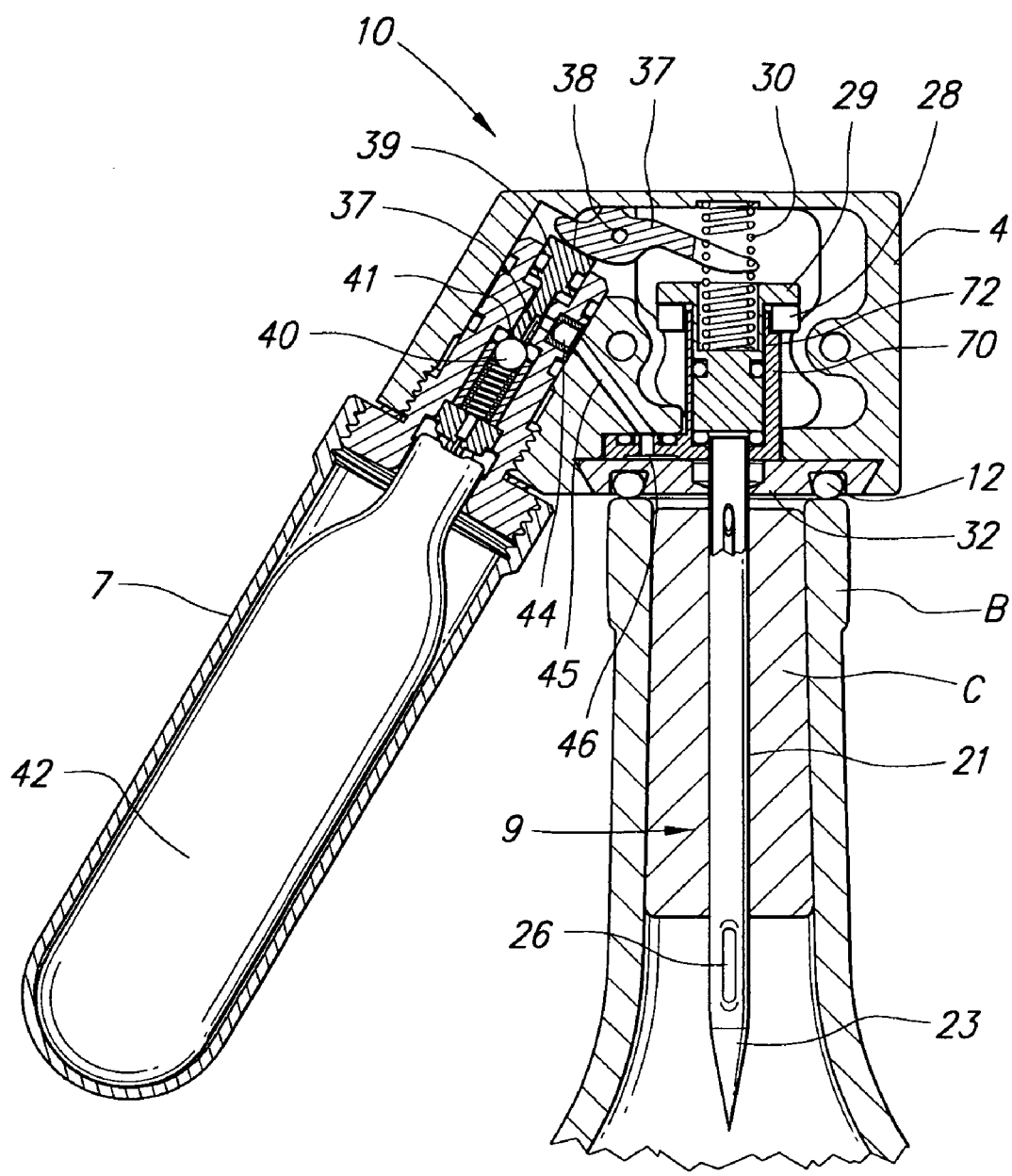
FIG. 9 is an environmental view in section similar to FIG. 8, but with the device shown in section along lines 9-9 of FIG. 1.
Figure 10:
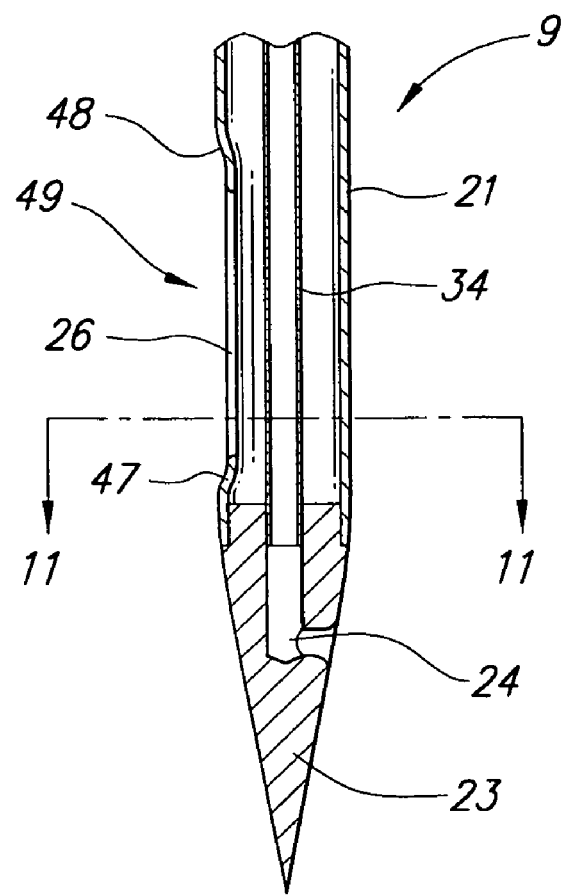
FIG. 10 is a partial side view in section of a hollow needle of a wine bottle sealing and dispensing device according to the present invention.

As shown in FIGS. 8-10, the device 10 has a hollow needle 9 having an upper open end 31 and a lower end 23, the lower end 23 having a liquid port 26 formed therethrough, as best shown in FIG. 9. The upper open end 31 is mounted to the housing 4 and projects downwardly therefrom, with the lower end 23 terminating in a relatively sharp tip adapted for insertion through the cork C into the interior of the corked wine bottle B.

The device 10 has a spout 8 having opposed first and second ends 76, 35, respectively. The first end 76 of the spout 8 is exposed and projects outwardly from the housing 4, and the second end 35 extends into the housing 4 and is in fluid communication with the upper open end 31 of the hollow needle 9. As shown in FIGS. 16 and 17, an aerator 63 may be provided for attachment to the first end 76 of the spout 8. The aerator 63 is mounted via O-rings 64, which both seal and grip the first end 76 of spout 8. Liquid flows from the first end 76 of the spout 8 into aerator chamber 65 and then through a venturi passage 66. As Bernoulli's principle teaches, flow through region 67, which has the smallest cross section in the venturi passage 66, creates a negative pressure relative to that of the atmosphere, drawing air into solution via ports 68. Some wine consumers find that aeration can soften tannins and improve the finish of the wine.

Figure 18:
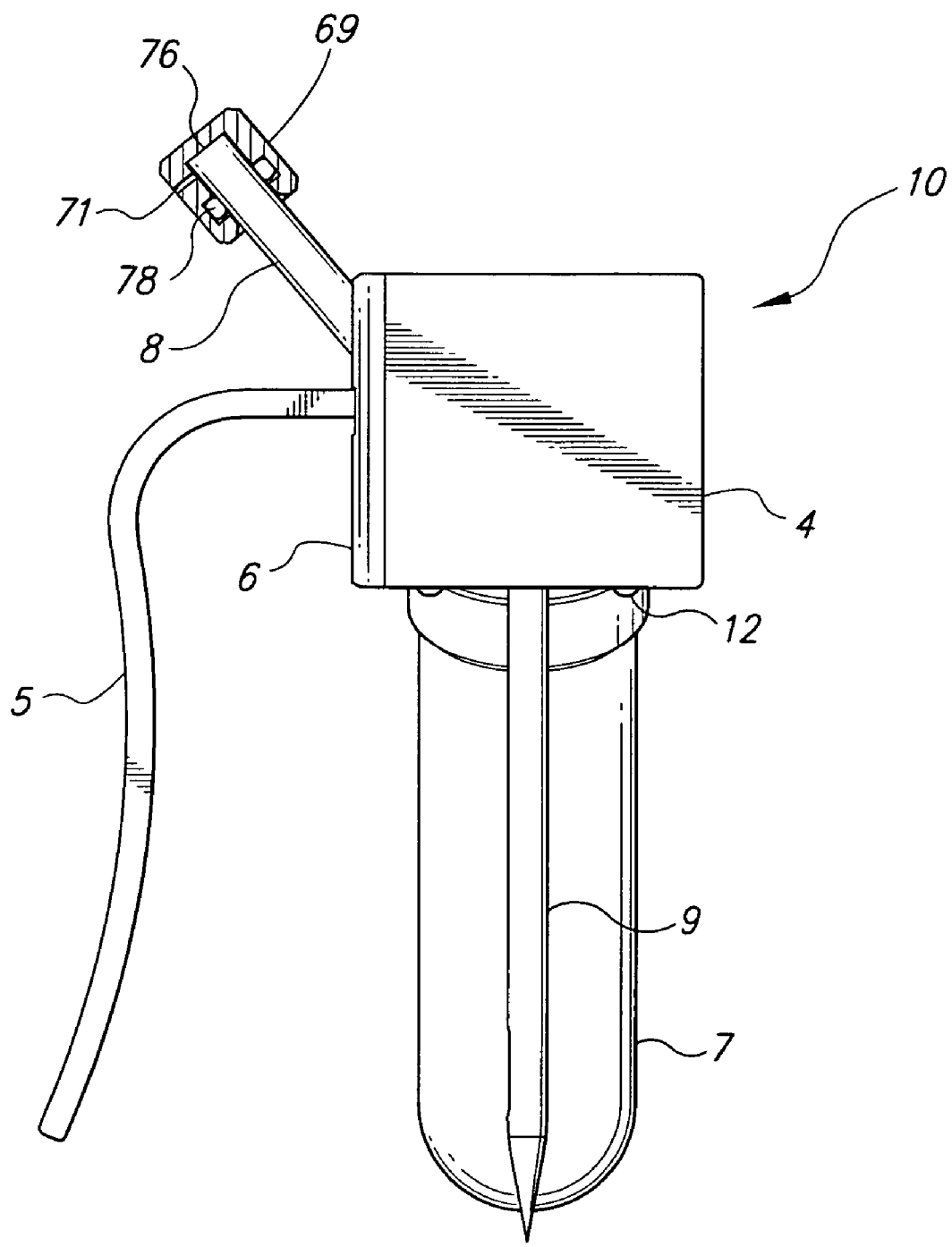
FIG. 18 is a side view of a wine bottle sealing and dispensing device according to the present invention, shown with an alternative dust cap, the dust cap being shown in section to show details thereof.

As an alternative, as shown in FIG. 18, a removable cap 69 may be provided for the covering and sealing the first end 76 of spout 8. While not necessary for sealing, cap 69 protects against dust entering the spout 8. Cap 69 is held in place by O-ring 78. Cap 69 includes vent 71, providing a safety measure that maintains communication to the atmosphere in the event that piston 29 is raised off its seal as a result of excess pressure in bottle B.

As shown in FIGS. 8-9, a piston 29 is slidably mounted within the housing 4. A lower end of the piston 29 selectively and releasably covers the upper end 31 of the hollow needle 9. Preferably, a resilient element 30, such as a helical compression spring or the like, resiliently biases the upper end of the piston 29 against an inner surface of the housing 4. A trigger member 5 is pivotally attached to the housing 4 and is coupled to the piston 29, so that when a user pivots the trigger member 5 with respect to the housing 4, the piston 29 is raised from a closed position, where the lower end of the piston 29 covers and seals the upper end 31 of the hollow needle 9, to an open position, where wine from within the bottle B is free to flow from within the bottle B into the interior of hollow needle 9 through port 26, then between the upper end 31 of the hollow needle 9 into the lower end 35 of spout 8, and through spout 8 for dispensing the wine.

Figure 4:
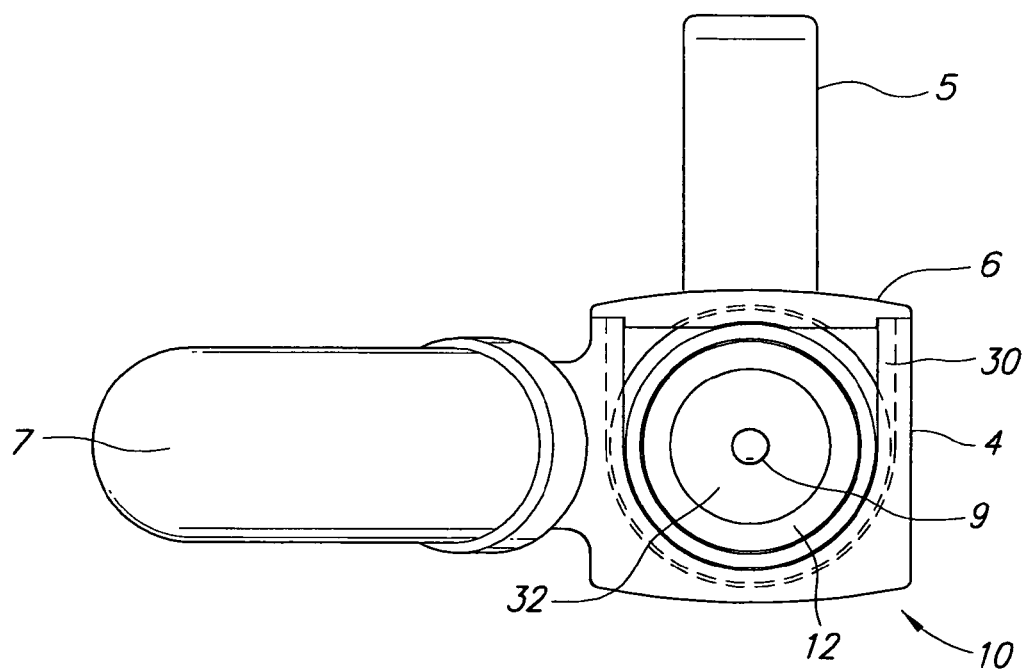
FIG. 4 is a bottom view of the wine bottle sealing and dispensing device of FIG. 1.

FIG. 2 illustrates the device 10 affixed to a wine bottle B. As shown, a seal 12 is compressed against the opening of bottle B. Seal 12 is preferably formed from a low-durometer rubber or the like, giving it sufficient pliability to allow for slight errors in the angle of insertion. As shown in FIGS. 3 and 4, a liquid carrying assembly, which includes the needle 9, piston 29 and spout 8, as described above, is fixed within and to housing 4 by a U-shaped dovetail 30 integral with the lower end of housing 4, and is further held by faceplate 6. FIG. 4 further shows the bottom of a sealing disc 32, which retains seal 12.

Figure 5:
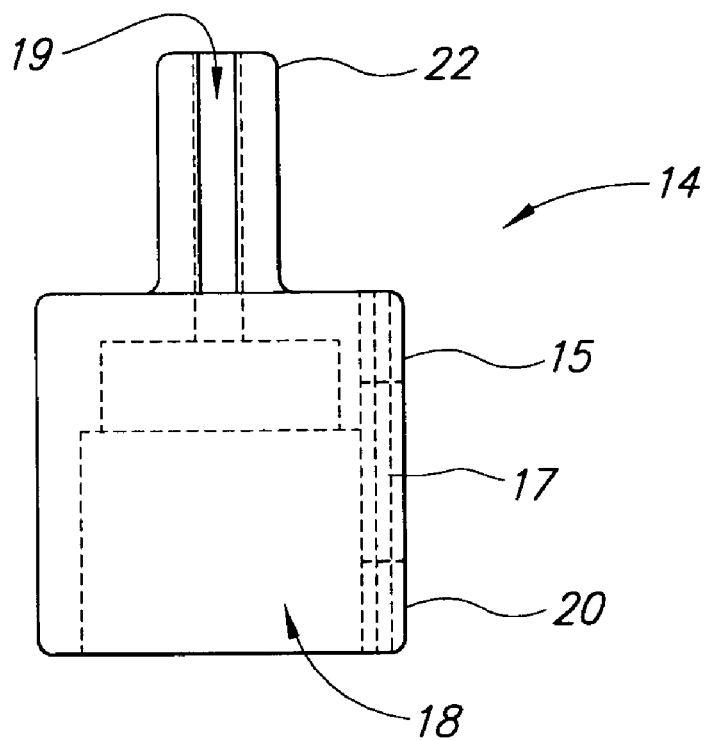
FIG. 5 is a side view of an insertion guide of a wine bottle sealing and dispensing device according to the present invention.
Figure 6:
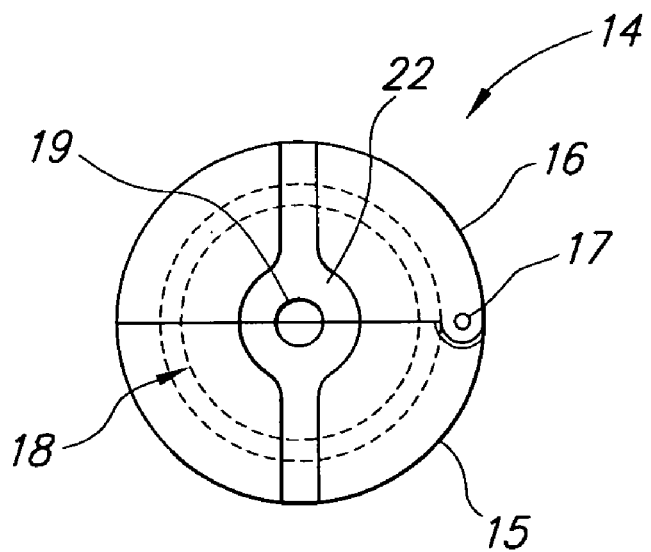
FIG. 6 is a top view of the insertion guide of FIG. 5.

FIGS. 5 and 6 illustrate an insertion guide 14, which includes first and second portions 15, 16, which are rotatably attached to one another via pin 17. When portions 15 and 16 are closed together, they define an interior cavity 18 and an upper sleeve 22, having a passage 19 defined therethrough in communication with cavity 18. As shown, cavity 18 preferably has a stepped contour, allowing for secure positioning over varying diameter bottle necks.

As shown in FIG. 7, insertion guide 14 is mounted on wine bottle B, with portions 15, 16 closed about the upper end of the bottle B, as shown. The pivoting of portions 15, 16 with respect to one another about pin 17 allows for the selective opening and closing of the guide 14 about the neck of the bottle B. When closed, cavity 18 is slightly oversized and accommodates most conventional bottle necks. As the user holds guide 14 against the mouth of bottle B, keeping guide 14 secured to and aligned with bottle B, needle 9 is inserted through passage 19 of sleeve 22. While maintaining downward pressure on guide 14, the user then pushes down on housing 4, thrusting needle 9 into and through the cork C. Preferably, needle 9 is coated with a non-stick material having a relatively low coefficient of friction. Once housing 4 is positioned flush against the top of guide 14, the user then pulls apart portions 15 and 16, opening cavity 18 so that guide 14 can be pulled sideways off bottle B. With guide 14 removed, the user can continue to press the needle 9 through the cork C until seal 12 mates with the upper end of the bottle B, as shown in FIG. 2.

In FIG. 8, needle 9 has punctured cork C of bottle B and is in communication with the interior of bottle B. As shown, the hollow needle 9 defines a liquid conduit 21, with gas conduit 34 positioned therein. Gas conduit 34 is fixed within liquid conduit 21 by tip 23 and terminates at a port or passage 24 formed through tip 23. Adjacent the upper end 31 of hollow needle 9, gas conduit 34 bends (to the left, in the orientation of FIG. 8), passing through and sealing an upper port 25 of liquid conduit 21.

To dispense liquid, the user tips the bottle B so that the neck is angled past horizontal (as if pouring a glass of wine from an open bottle), causing port 26 of liquid conduit 21 to be enveloped in the wine from within bottle B (port 26 is best shown in FIG. 9). The user then pulls trigger 5 toward bottle B, causing trigger 5 to pivot counter-clockwise about pin 27, which is rotatably mounted to faceplate 6. Fork 28 at the interior end of trigger member 5 urges piston 29 upward against the bias applied by spring 30, opening the upper end 31 of needle 9. It should be noted that "upward" refers to the orientation of FIG. 8. Due to the resilient biasing, piston 29 is normally sealed to valve body 70 by O-ring 33.

With the open upper end 31 uncovered by the lower end of piston 29, wine is free to flow through port 26, up through liquid conduit 21, into cylinder 72, through the lower end 35 of spout 8, and up through spout 8 to be dispensed through end 76 thereof. The wine is prevented from leaking around piston 29 by O-ring 36. It should be noted that as the piston 29 slides back and forth within cylinder 72, O-ring 36 always remains positioned above port 35 (the lower end of the spout 8), allowing for smooth trigger operation and preventing abrasion of O-ring 36 against the edge of port 35.

Because the wine bottle B is sealed from the atmosphere, gas must be introduced into bottle B to break the vacuum and allow the wine to flow. FIG. 9 illustrates the gas assembly of the device 10. As a safety measure, gas is only introduced when there is a clear line of communication between bottle B and the atmosphere. A cartridge 42 of pressurized, inert gas is mounted to the housing 4, with the cartridge 42 being in fluid communication with an upper end of the gas conduit 34, which is mounted within the hollow needle 9, as described above. The lower end of the gas conduit 34 is in fluid communication with gas port 24, formed through the hollow needle 9 adjacent the tip 23 of the needle 9 (best shown in FIG. 10). Preferably, a cartridge holder 7, which is adapted for receiving the cartridge 42 of pressurized inert gas, is releasably attached to the housing 4 by a threaded connection or the like, as shown, allowing for the removal and replacement of the cartridge 42 of pressurized inert gas.

As the user continues to pivot the trigger member 5, the fork 28 lifts the piston 29 upward against a cam 37, rotating the cam 37 counterclockwise about pin 38. The cam 37, in turn, urges pusher pin 39 downward (in the orientation of FIG. 9) against ball 40, opening port 41. This allows pressurized gas from the cartridge 42 to flow into the passage 37, through an orifice 44, then through a channel 45, and into a passage 46 formed through valve body 70. The gas then flows through the port 25 and through the gas conduit 34, where it enters the interior of the wine bottle B via passage 24 in tip 23. FIG. 15 best shows the pusher pin 39 depressed so that the ball 40 has just pulled away from O-ring 57, allowing gas flow through the passage 37 into the orifice 44.

It should be noted that, in the orientation of FIG. 8, liquid port 26 is positioned opposite gas passage 24, thus orienting port 26 so that it is pointed downward into the wine during pouring. Gas expelled through passage 24 forms a stream of bubbles that rises to the top of the wine level in the bottle B, and if passage 24 were situated below port 26, those bubbles would enter the wine outflow and waste gas. This arrangement further aids in mitigating the outflow of sediment, which can form in wines that have aged.

Liquid flow is stopped by releasing trigger member 5, with compression spring 30 biasing piston 29 back down against O-ring 33, sealing the upper end 31 of needle 9. Sealing the upper end 31 immediately stops the flow through the spout 8. It should be noted that the spout 8 maintains a solid column of liquid without dripping when its lower end is sealed as a result of its relatively small diameter. Further, because the piston 29 is held by spring bias, it serves as a relief valve in case a gas leak over-pressurizes the wine bottle B.

Preferably, liquid flows through the spout 8 at a rate that is comparable to the rate of a typical pour from an uncorked bottle of wine. This rate is a function of the inner diameter of the liquid conduit 21 defined by the needle 9, the outer diameter of the gas conduit 34, the cross section and geometry of port 26, and the pressure created in the wine bottle B by the gas cartridge 42. This pressure should be minimal, for safety reasons, to prevent the cork C from accidentally popping out of the bottle B, as well as the practical matter of conserving gas within the cartridge 42. Similarly, the geometry of the hollow needle 9 is preferably configured to ease insertion of the needle 9 through the cork C to prevent forcing the cork C into bottle B.

Preferably, the outer diameter of the liquid conduit 21 has a maximum value of approximately 0.1875 inches. When the conduit 21 and the piercing tip 23 are treated with a low-friction coating, needle 9 can easily be pushed into both natural and artificial corks. The preferred geometry of the piercing tip 23 has a length-to-diameter ratio of approximately 2.8. As shown in FIG. 10, the piercing tip 23 transitions smoothly into the liquid conduit 21, which further facilitates insertion thereof within cork C.

The typical pouring rate for wine ranges between approximately 22 and 36 mL/s. If the needle 9 has a maximum outer diameter of 0.1875 inches and a length of approximately three inches, the liquid assembly can deliver approximately 26 mL/s of wine flow with approximately four p.s.i. of interior bottle pressure.

Figure 11:
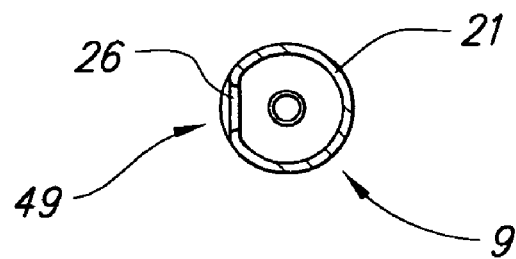
FIG. 11 is a section view along lines 11-11 of FIG. 10.

Further, in order to prevent accidental shredding of the cork C during insertion of the needle 9, the widths of ports 24 and 26 are preferably minimized. The preferred geometry is relatively slender, and the apertures' edges are rolled slightly inward. As shown in FIG. 10, the port 26 is recessed in the wall of needle 9, allowing the cork C to pass without catching any sharp edges. As the needle 9 is inserted, the cork C travels up around radius 47, past port 26, and around radius 48. Radii 47 and 48 allow smooth transitions into port 26, which is cut in flattened region 49 of needle 9. A profile of flattened region 49 can be seen in FIG. 11.

Figure 12:
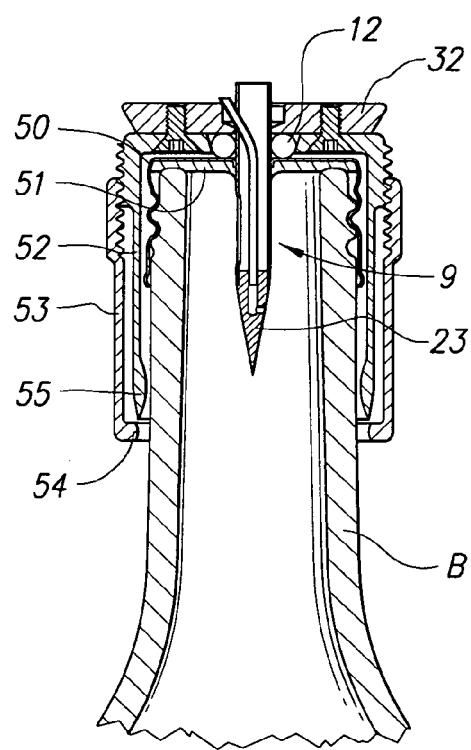
FIG. 12 is an environmental side view in section of an alternative embodiment of a wine bottle sealing and dispensing device according to the present invention.
Figure 13:
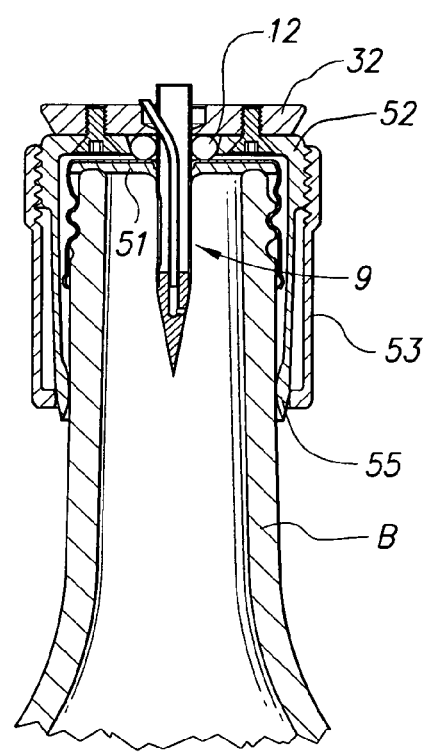
FIG. 13 is an environmental side view in section of the wine bottle sealing and dispensing device of FIG. 12.

The hollow needle 9 can also pierce screw caps. However, such features such as the low-friction coating and the recessed port 26 are not necessary for this application. FIGS. 12 and 13 illustrate an alternative liquid assembly for puncturing screw caps. The primary difference in this embodiment is that the hollow needle 9 is shorter, as the height or depth of the cork C does not have to be traversed.

FIGS. 12 and 13 illustrate needle 9 puncturing a screw cap 50. During insertion, the needle 9 is sealed to cap 50 by plastic liner 51, which also seals cap 50 to bottle B. Such liners are integral with typical caps. Fastened to sealing disc 32 is collet 52, which serves to center the needle 9 with respect to the cap 50 as it is being inserted. In order to facilitate this, collet 52 extends slightly below the tip 23 of the needle 9. The collet 52 is also used to secure disc 32 (and, ultimately, housing 4) to the bottle B. Once needle 9 is fully inserted such that seal 12 is compressed against cap 50, sleeve 53, which is threadedly attached to collet 52, is rotated such that it is drawn upward. Nose cap 54 then engages fingers 55 (which are preferably free to bend independently), urging them inward toward bottle B. FIG. 13 shows the collet 52 in the locked position, with fingers 55 firmly wedged against bottle B.

FIG. 14 best illustrates the gas assembly, with FIG. 15 illustrating an enlarged view of section A. As noted above, the cartridge 42 contains an inert gas, such as argon, under high pressure, typically at least 2,800 p.s.i. A cartridge 42 having a volume of approximately 22 cm³, pressurized to 2,800 p.s.i., will serve approximately four or five standard 750 mL wine bottles before needing replacement.

The cartridge 42 is removed by unscrewing the cartridge holder 7, which is fastened to the valve body 54. A fresh cartridge 42 is installed by dropping the new cartridge 42 into the holder 7 and then screwing the holder 7 to the valve body 54. As the holder 7 is rotated, the neck of the cartridge 42 advances upward towards a puncture pin 55. The cartridge 42 is typically sealed by a thin metal cup, which is pressed into the neck. Just before engaging the puncture pin 55, the cartridge 42 contacts an O-ring 56, thereby sealing the cartridge 42 to the valve body 54 before being punctured (thus preventing gas loss).

Continued rotation of the holder 7 causes the pin 55 to pierce the cartridge 42, allowing gas to flow through into the valve body 54. Pressure is contained by ball 40, which is sealed to valve body 54 via an O-ring 57. The ball 40 is laterally stabilized by a sleeve 58 and is held against the O-ring 57 by a resilient element 59. The sleeve 58 allows the ball 40 to be smaller in diameter than the outer diameter of the O-ring 57. This reduces the area of contact between the two, thus reducing the upward force against the ball 40 for a given pressure provided by the cartridge 42. Further, positioning the contact point toward the center of the O-ring improves flow controllability, with the rate of flow being a function of pusher pin 39 deflection.

Figure 19:
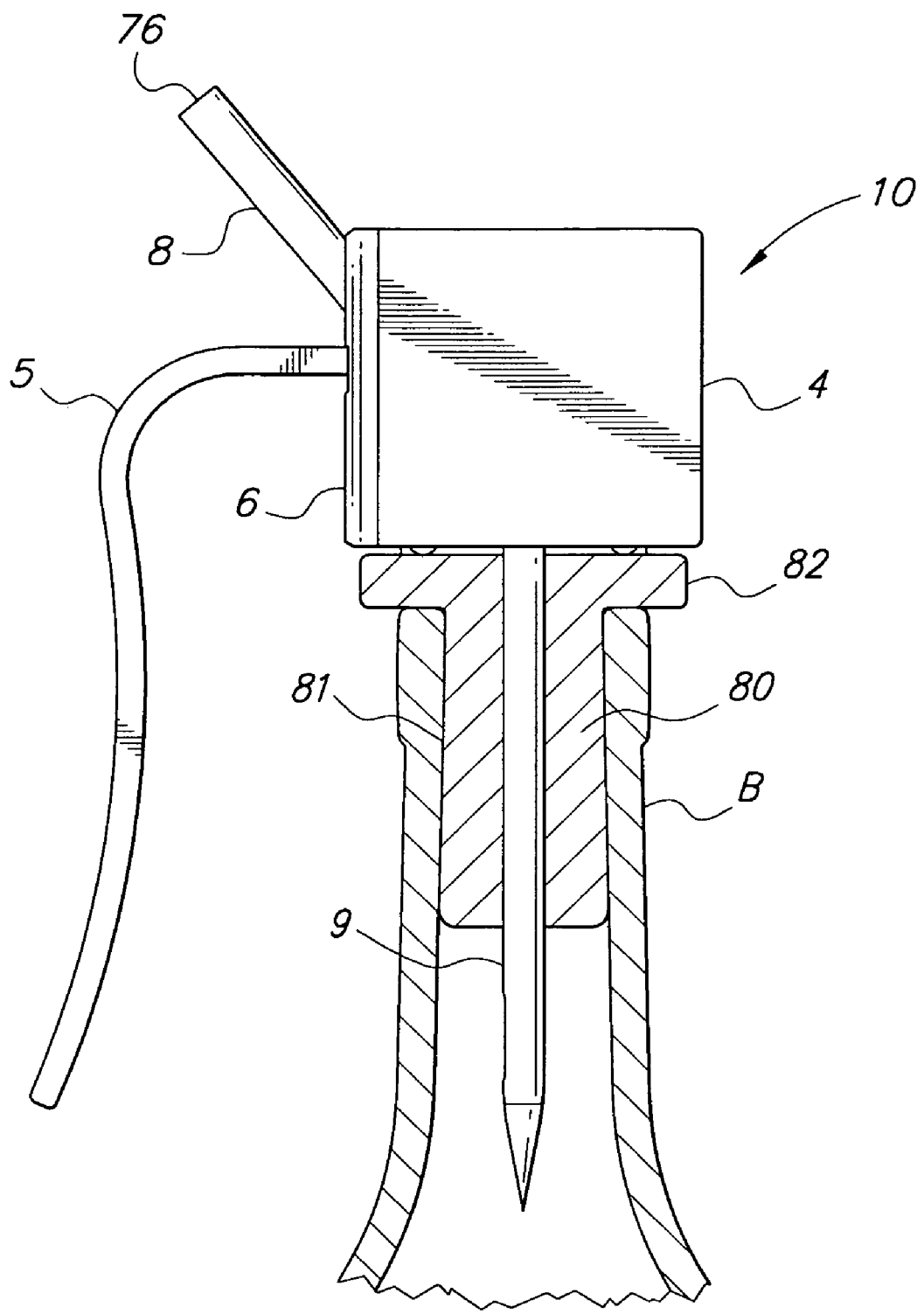
FIG. 19 is a side, partial cross-sectional environmental view of another alternative embodiment of the wine bottle sealing and dispensing device according to the present invention.

In the alternative embodiment of FIG. 19, the sealing and dispensing device 10 is mounted to bottle B, as described above, but cork C has been removed and replaced by a stopper 80. Corks, at times, become dried out and degraded to the point where they may not be easily punctured. With cork C being replaced by stopper 80, which is formed from pliable material which is inert with respect to wine, bottle B may be easily sealed with device 10, as described above. Stopper 80 of FIG. 19 may also be used to mount device 10 to a screw-capped bottle, such as that described above with reference to FIGS. 12 and 13. As shown, stopper 80 has a central channel 81 formed therethrough for receiving needle 9. Preferably, channel 81 is formed with a diameter slightly smaller than that of the outer diameter of needle 9 such that when needle 9 is pushed through channel 81, a secure, fluid-tight seal is formed between needle 9 and the wall defining channel 81, and stopper 80 is firmly clamped to bottle B (and securely seals bottle B in a fluid-tight manner). Stopper 80 is formed from a resilient, elastic material. As shown, stopper 80 preferably includes an annular rim 82, which is seated on the upper surface of bottle B's neck and securely seals the open upper end of bottle B. Rim 82 further allows for easy removal of stopper 80.

It is to be understood that the present invention is not limited to the embodiments described above, but encompasses any and all embodiments within the scope of the following claims.

We claim:

1. A liquid container sealing and dispensing device, comprising:
    a housing adapted for mounting on an upper surface of a seal of a sealed liquid container, the housing defining an open interior region therein;
    a hollow needle having an upper open end and a lower end, the lower end having a liquid port formed therethrough, the upper open end being mounted to the housing and projecting downward therefrom, the lower end terminating in a tip and being adapted for insertion through the seal into the sealed liquid container;
    means for selectively dispensing liquid from the sealed liquid container, the means for dispensing being in communication with the hollow needle, wherein the means for selectively dispensing liquid from the sealed liquid container comprises:
        a spout having opposed first and second ends, the first end being exposed and projecting outwardly from the housing, the second end extending into the housing and being in fluid communication with the upper open end of the hollow needle;

a piston slidably mounted within the housing, the piston having a lower end selectively and releasably covering the upper end of the hollow needle in a closed position; and a trigger member pivotally attached to the housing and coupled to the piston, the trigger member pivoting between the closed position and an open position raising the piston from the open end of the needle to permit dispensing liquid from the spout; and means for delivering an inert gas into the sealed liquid container, wherein the means for delivering inert gas into the sealed liquid container comprises:

a cartridge of pressurized, inert gas mounted to the housing, the cartridge being in fluid communication with an upper end of a gas conduit, the gas conduit extending through the hollow needle, the tip of the needle having a gas port formed in the tip, the gas conduit having a lower end in fluid communication with the gas port;

a cartridge holder adapted for receiving the cartridge of pressurized, inert gas, the cartridge holder being releasably attached to said housing;

a spring-biased ball valve for controlling gas flow between the cartridge of pressurized, inert gas and the gas conduit;

a pusher pin slidably disposed within the housing, the pusher pin contacting the spring-biased ball valve so that selective downward movement of the pusher pin opens the ball valve to release the pressurized, inert gas from the cartridge; and a cam pivotally mounted within the housing, the cam having a first end bearing against the piston and a second end bearing against the pusher pin, the cam pivoting in response to upward movement of the piston to move the pusher pin downward to release the pressurized, inert gas from the cartridge.

2. The liquid container sealing and dispensing device as recited in claim 1, further comprising an auxiliary seal mounted on the first end of the spout, the auxiliary seal being selected from the group consisting of: an aerator and a cap.

3. The liquid container sealing and dispensing device as recited in claim 1, further comprising a stopper for selective replacement of the seal of the sealed liquid container, the stopper being formed from a resilient material and having a central, axial channel formed therethrough for receiving the hollow needle.

\* \* \* \* \*